United States Patent [19]
Valentin et al.

[11] Patent Number: 5,999,673
[45] Date of Patent: Dec. 7, 1999

[54] COUPLING ARRANGEMENT BETWEEN A MULTI-MODE LIGHT SOURCE AND AN OPTICAL FIBER THROUGH AN INTERMEDIATE OPTICAL FIBER LENGTH

[75] Inventors: Gapontsev .P. Valentin; Samartsev Igor, both of Fryazino, Russian Federation

[73] Assignees: Italtel Spa, Milan, Italy; Ire-Polus Co., Moscow, Russian Federation

[21] Appl. No.: 08/860,252

[22] PCT Filed: Dec. 28, 1994

[86] PCT No.: PCT/IT94/00218

§ 371 Date: Sep. 5, 1997

§ 102(e) Date: Sep. 5, 1997

[87] PCT Pub. No.: WO96/20519

PCT Pub. Date: Jul. 4, 1996

[51] Int. Cl.⁶ .................................................. G02B 6/26
[52] U.S. Cl. ................................................................. 385/43
[58] Field of Search .............................. 385/40–45, 82, 385/88, 92, 24, 52, 33, 38; 372/6

[56] References Cited

U.S. PATENT DOCUMENTS

| | | | |
|---|---|---|---|
| 4,184,741 | 1/1980 | Hawk et al. | 385/92 |
| 4,755,037 | 7/1988 | Bjornlie et al. | 385/43 |
| 4,765,706 | 8/1988 | Marcatili et al. | 385/24 |
| 4,807,954 | 2/1989 | Oyamada et al. | 385/43 |
| 4,829,529 | 5/1989 | Kafka . | |
| 4,957,342 | 9/1990 | Boudreau et al. | 385/52 |
| 5,170,458 | 12/1992 | Aoyagi et al. . | |

FOREIGN PATENT DOCUMENTS

| | | |
|---|---|---|
| 0136871 | 4/1985 | European Pat. Off. . |
| 0180861 | 5/1986 | European Pat. Off. . |
| 0497243 | 8/1992 | European Pat. Off. . |
| 0565843 | 10/1993 | European Pat. Off. . |
| 60-107007 | 6/1985 | Japan . |

OTHER PUBLICATIONS

Optical Fiber Communication Conference 1992 Technical Digest Series, vol. 5, Conference Edition, Feb. 2–7, 1992, San Jose, California.

"Asymmetric Multimode Couplers" R. Griffin, et al., Journal of Lightwave Technology Nov. 1991, No. 11, pp. 1508–1517.

"Hybrid Laser–to–Fiber Coupler With a Cylindrical Lens", M. Maeda, et al., Applied Optics, vol. 16, No. 7, Jul. 1977.

"Performance of Single Mode Fiber Couplers and Power Dividers Using Tapered Structure" Y. Naruse, et al, Dept. of Electronic Engineering, pp. 293–296.

*Primary Examiner*—Akm E. Ullah

[57] ABSTRACT

A coupling arrangement for non-axial transfer of light power between a multi-mode light source (LS), having a substantially circular emission with a divergence angle as, and a multi-mode optical fiber (FF) with a cross section Ac, through a length of an intermediate feeding multi-mode optical fiber (IF) having an end with cross section area Af coupled with said light source (LS) and one portion fused to said optical fiber (FF). Said feeding fiber (IF) has a progressively tapered portion and is fused to said multi-mode optical fiber (FF) at a region of the tapered fiber, and in that the relationship between the acceptance angle $\alpha f$ of the feeding fiber (IF) and the emission angle $\alpha s$ of the light source (LS) is expressed by: $\alpha f = k \cdot \alpha s$ where k is a positive constant greater than 1.

26 Claims, 5 Drawing Sheets

COUPLING ARRANGEMENT BETWEEN A MULTI-MODE LIGHT SOURCE AND AN OPTICAL FIBER THROUGH AN INTERMEDIATE OPTICAL FIBER LENGTH

FIELD OF THE INVENTION

This invention relates in general to the coupling or transfer of light power between a light source and an optical guide, and more particularly to arrangements for improving the energy transfer efficiency between a light source and an optical fiber through an intermediate optical fiber length or pigtail, when a coaxial feeding to the final optical fiber is either undesired or impossible.

In a particular and preferred embodiment that will be illustrated in detail, the system acts as a part of an optical amplifier. In this case the light source includes a multi-mode semiconductor laser diode—or an array of such diodes—emitting around a certain wavelength and acting as a pump source, and the final optical guide includes a single-mode core carrying a travelling signal (single-mode radiation of a wavelength different from the pumping one) to be amplified.

In the above mentioned preferred embodiment the invention aims in particular to realize a highly efficient coupling between a multi-mode optical fiber pigtail and a so called single-mode double-cladding (SM-DC) optical fiber, although the invention is not to be considered restricted to such a preferred application. As Single-Mode Double-Cladding (SM-DC) optical fiber it is meant a fiber that includes an inner (Single-Mode) core with a diameter of few microns, a first cladding (or multi-mode core), and a second cladding. Actually there are a number of situations in which a fiber needs to receive light from one or more sources in a non-coaxial way, i.e. not along the longitudinal axis of the fed fiber. As an example, whenever it is requested to carry two or more different radiations along a single guide (with the radiations being different in amplitude, wavelength, signal pattern or code, and so on) an increase of the number of different sources is involved, which can be also of different kinds, and some kind of separation of the optical paths entering the final guide is required. Furthermore a non coaxial coupling arrangement could be required in a fiber laser device in which the axial pumping would require a special mirror (with selected reflectivity) which should be transparent to the pump radiation, and with a high reflectivity at the lasing wavelength.

Another situation in which a non-coaxial feeding is requested is disclosed for example in U.S. Pat. No. 5,170,458 concerning an optical amplifier obliquely receiving the pumping light.

There are known several arrangements for coupling a (additional) light source to an optical fiber that include one or more of the following coupling devices:

a prism the insertion of an optical guide of whatever kind (integrated or with discrete elements)

an intermediate optical fiber joined to the final fiber by means of a micro-optic coupler (i.e. a coupler adopting microlenses, or beam splitters, or other discrete microscopic devices) or an intermediate optical fiber joined to the final fiber by means of a fused-fiber coupler.

The above first three examples raise considerable alignment problems in terms of mechanical tolerances, that make their realization very expensive and critical from a technological point of view, in general producing a poor coupling efficiency.

Usually, in telecommunication systems incorporating optical fiber amplifiers (OFAs), i.e. lengths of properly doped single-mode optical fiber serially connected in the communication route, these lengths of fiber are fed with light from one or more single-mode laser diodes through suitable fused-fiber couplers, each of them being in turn coupled with one or more laser diodes. Such (single-mode) couplers, formed by merging or fusing two or more pieces of fiber, can show a coupling efficiency as high as 90%. In coupling the laser chip to the pigtail. an efficiency of less than 50% is normally achieved. Due to the limited power obtainable from single mode diodes, high optical power is needed, the system has to include a large number of diodes, decreasing the reliability of the system as a whole.

In order to improve the saturated output power of the optical amplifier, without increasing the number of pump diodes involved, it has been suggested (see for example U.S. Pat. No. 4,829,529 to Kafka) to use a SM-DC optical fiber, activated by one or more diode arrays coupled by means of bulk optics to the fiber end face.

The present invention concerns an arrangement which allows the use of multi-mode laser diode(s) or an array thereof coupled to the final fiber through an intermediate optical fiber and a fused-fiber coupler. This is advantageous since multi-mode laser diodes are capable of reaching higher output power levels than single-mode diodes, and maintain good performance and reliability.

As it is known, a multi-mode laser chip emits light through a narrow slit having a thickness in the order of 1 micron and a width that can be of several tens of microns, with the light beam highly diverging in the transverse plane and moderately diverging in a plane parallel to the slit width. As an example, for laser diodes with 50 $\mu$m stripe width, in order to collect as much light as possible, a pigtail i.e. a multimode fiber is usually adopted with a diameter of about 60 microns and a Numerical Aperture of about 0.35, the numerical aperture (NA) of an optical fiber being the sine of the vertex angle of the largest cone of meridional rays that can enter (or leave) an optical fiber.

This simple, direct coupling scheme allows for a coupling efficiency of at most 50%.

BACKGROUND ART

EP-A-0 136 871 discloses a pair of small diameter optical fibers (12, 14) arranged in a side-by-side configuration, the first fiber (12) providing a passive guide for pump light, and the second fiber (14) formed of a material, such as Nd:YAG which has amplifying properties at the signal frequency. The signal to be amplified propagates through the second fiber (14) resulting in amplification of the signal. The first fiber (12) is pumped from one or both ends, utilizing a cone shaped rod (50) which is optically coupled thereto. A plurality of pump light sources (60) are mounted on the end face (58) of the rod (50) to introduce collimated pump light into the large end (52) of the cone shaped rod (50).

It is known to improve the coupling efficiency by locating a cylindrical lens between the laser chip and one end of the pigtail, with the cylindrical lens focusing the transverse component of the laser beam into the fiber core. In this respect reference can be made to EP-A-0 565 843 and also to "Hybrid laser-to-fiber coupler with a cylindrical lens" by Maeda M. et al., Applied Optics, Vol. 16, No. 7, July 1977, pp 1966–1970.

Such cylindrical lens does not modify the divergence of the beam in the plane of the slit axis, so that at a proper distance the beam from the laser chip is substantially reduced to having a circular cross section and can easily be coupled to the core of the optical fiber.

The pigtail is further fused to the final fiber, i.e. in general the fiber to be fed or in particular the fiber carrying the signal to be amplified, either at the other end of the feeding pigtail (Y coupler) or along a portion of the feeding pigtail length (X coupler). The coupling ratio of such coupler is proportional to the ratio of the squared diameter of the receiving fiber core to the squared diameter of the receiving fiber core plus the squared diameter of the feeding fiber core.

By using the SM-DC fiber technique an efficient feeding of a single-mode fiber core through a multi-mode fiber pigtail can be achieved. When the multi-mode core of the SM-DC fiber has the same diameter of the feeding fiber (i.e. 60 µm), the coupling ratio is about 0.5. To further increase the coupling ratio to the SM-DC fiber it is necessary to reduce the feeding fiber core diameter. With a diameter of less than 20 microns the coupling ratio could theoretically reach values greater than 0.9.

However, with a reduced core diameter of the multi-mode feeding fiber to improve the efficiency of the light transfer at the coupler, the efficiency of the light transfer from the laser to the feeding fiber would become very poor even using a cylindrical lens.

OBJECT OF THE INVENTION

It is therefore an object of this invention to provide an improved and highly efficient arrangement for transferring multi-mode light source power to an optical fiber along a non-coaxial direction, which is substantially free from the above mentioned drawbacks.

SUMMARY OF THE INVENTION

The above object is achieved through the invention which includes a coupling arrangement for non-axial transfer of light power between a multi-mode light source, having a substantially circular emission with a divergence angle $\alpha s$, and a multi-mode optical fiber with a cross section Ac, through a length of an intermediate feeding multi-mode optical fiber having an end with cross section area Af coupled with said light source and one portion fused to said optical fiber, wherein said feeding fiber has a tapered portion, that is a portion with progressively reducing diameter, and is fused to said multi-mode optical fiber FF at a region of the tapered portion, and in that the relationship between the acceptance angle af of the feeding fiber and the emission angle as of the light source is expressed by:

$$\alpha f = k \times \alpha s$$

where k is a positive constant greater than 1.

According to the invention, a cylindrical lens is used to couple radiation from a multimode laser chip (or an array thereof) to a length of multimode feeding fiber, in such a way that the divergence angle of the radiation beam propagating along the fiber is smaller than the acceptance angle of the fiber itself, The feeding fiber (either at the far end or along its length) is tapered, i.e. heated and pulled, in order to reduce its diameter and then a coupler is formed for example by twisting and fusing such tapered portion of fiber on the fiber to be fed, and in particular—according to a preferred industrial applicability of the invention—on the signal carrying fiber.

The above operation sequence is not compulsory. For example the coupler can be formed first and then connected to a multimode source or alternatively spliced to an already pigtailed multimode source. Other combinations are possible as well.

The operation of the invention can be understood substantially as follows.

It is well known to those skilled in the art that the quantity of radiation emitted by the unit surface of a source into the unit solid angle (the so called "radiance") cannot be increased by passive optics, therefore a reduction in size of the fiber core produces an increase in the divergence angle of the beam propagating along the fiber itself. As far as such angle remains smaller than the N.A. of the fiber, no loss is encountered and it is therefore possible to produce efficient coupling between such a tapered fiber and an untapered one.

The coupling arrangement of EP-A-0 136 871 differs from that of the present invention in that the feeding fiber 12 of such patent is not fused to the optical fiber 14 but rather extends parallel thereto within a coupling jacket 22. Further, although the feeding fiber 12 has a progressively tapered (cone shaped) portion at its first end for collimating the light from the pump source(s), it is not this tapered portion which is adjacent to and used for coupling to the fiber 14.

A more detailed explanation can be found in the description of the annexed figures.

Additional and peculiar advantages are disclosed in the appended claims.

BRIEF DESCRIPTION OF THE DRAWINGS

Preferred but non limiting embodiments of the invention will now be described in details with reference to the attached drawings, in which.

DETAILED DESCRIPTION OF A PREFERRED EMBODIMENT

Figure 1:
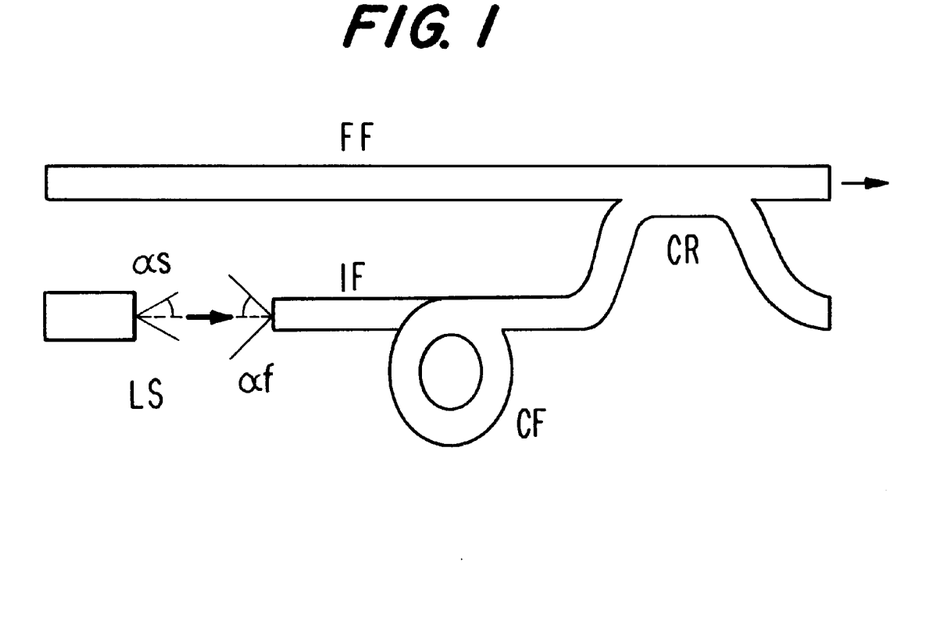
FIG. 1 schematically shows a general arrangement for coupling a light source to an optical fiber through an intermediate optical fiber length.

In the drawings the same references are used to indicate the same or similar components throughout all the Figures. With reference to FIG. 1, the illustrated coupling arrangement comprises a multi-mode light source LS having a substantially circular emission with an angle of divergence αs coupled to one end of an intermediate length of optical fiber IF, having an angle of acceptance αf. A portion of the intermediate fiber IF is spliced or fused in the coupling region CR to an optical fiber FF carrying an information signal or the like, forming a so called X coupler. A portion of the intermediate fiber IF can be coiled as shown at CF, if necessary. Of course the fiber IF could be spliced at its other end, forming a so called Y coupler.

As it is known the acceptance angle αf of an optical fiber is a function of the refractive indexes of the core and cladding thereof. According to the invention, the acceptance angle αf of the intermediate fiber IF at its coupling end with the light source LS is greater than the emission angle αs of the multi-mode light source itself. Thus a good coupling efficiency can be obtained.

Figure 2:
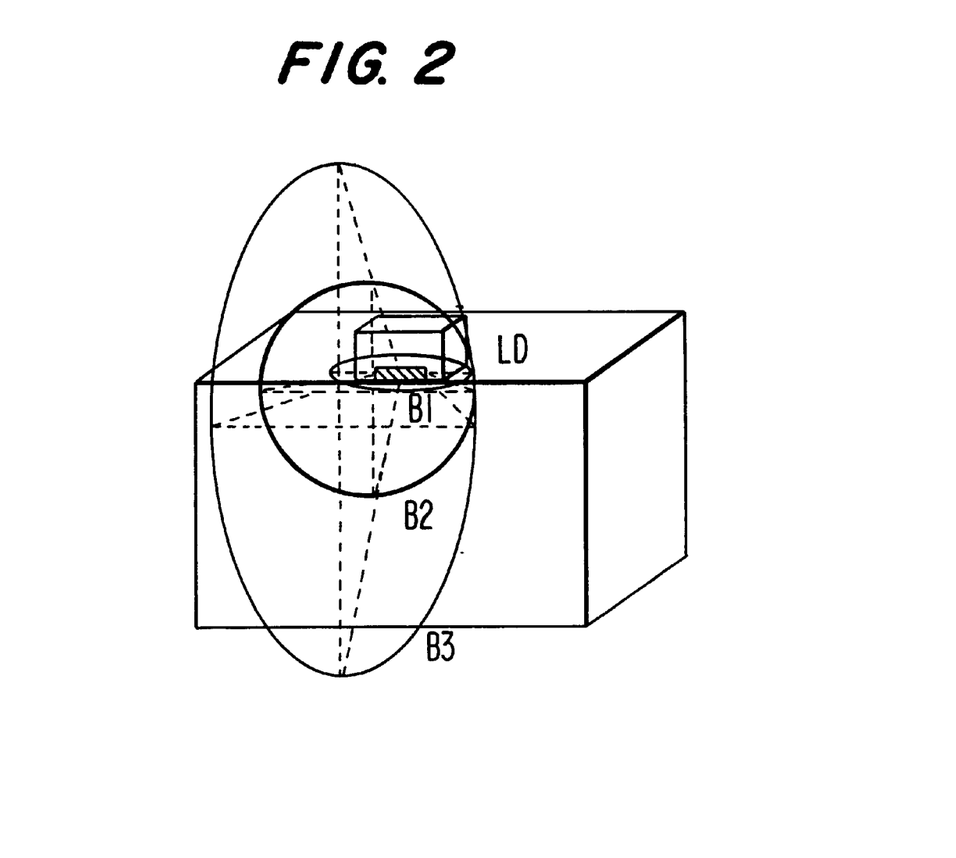
FIG. 2 is a schematic front view of a multimode laser chip illustrating the outcoming laser beam shape.

FIG. 2 shows a front view of a multi-mode laser diode LD, not in scale, with a thickness of about 1 micron and a width in the order of 50 microns.

As illustrated in the Figure, the emission beam of the laser diode is substantially elliptical, with an angle of divergence of about 35–40 degrees in the plane perpendicular to the laser junction (i.e. a plane along the thickness of 1 micron), and an angle of divergence of about 10–15 degrees in the plane of the laser junction (plane along the width of 50 microns).

Three subsequent traces B1, B2 and B3, progressively spaced away from the source of the beam (the diode front surface) are shown for illustrative purposes only. It is apparent that, being the greater diverging angle in correspondence with the shorter side of a rectangle, at a certain distance from the diode surface there will be a cross section of the laser beam (here B2) substantially circular, beyond which the relative dimensions of the ellipse appear exchanged (that is the major axis of the elliptical beam is rotated. by 90 degrees).

FIGS. 3 to 7 illustrate a preferred arrangement of the invention that is particularly useful in coupling a pump multi-mode light source with one end of a feeding optical fiber which in turn is coupled to an SM-DC fiber length as a peculiar component of an optical amplifier.

Figure 3:
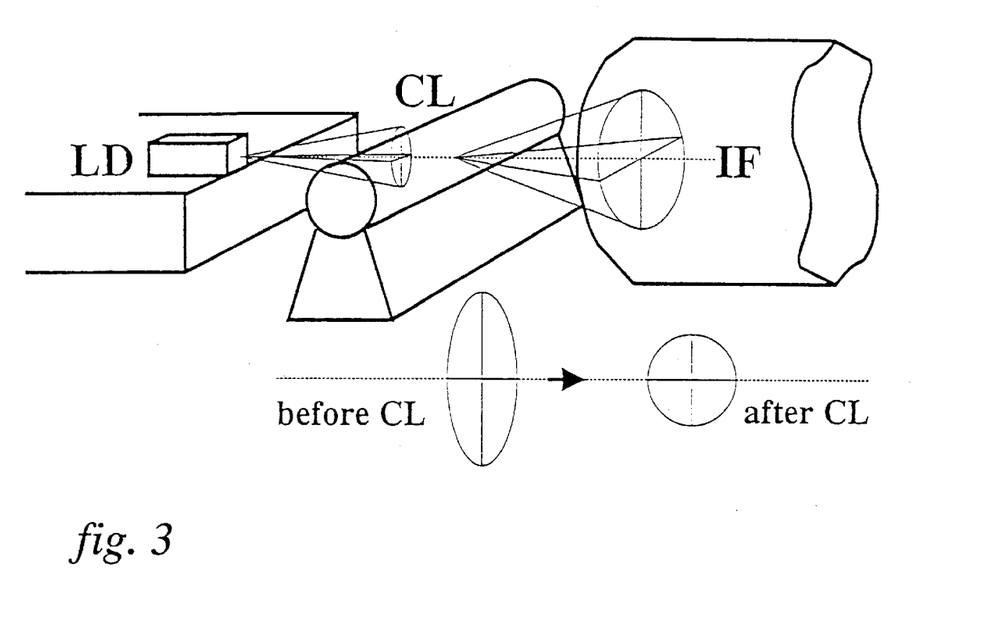
FIG. 3 schematically shows a multimode light source including a semiconductor laser diode and a cylindrical lens, coupled to a multi-mode fiber pigtail.

With reference to FIG. 3, a semiconductor laser diode LD emitting a multi-mode radiation or light beam LB is coupled through a cylindrical lens CL with one end of an intermediate multi-mode optical fiber IF.

The cylindrical lens CL is located in the elliptical light beam LB between the laser diode LD and the feeding fiber IF so as to progressively reduce the divergence of the transverse component of the laser beam until it becomes equal to or possibly even smaller than the divergence of the parallel component, thus forming a substantially circular beam that is coupled into the feeding fiber. The means through which the components can be positioned in respect of each other are conventional in the art and therefore have not been illustrated.

In accordance with the invention the emission angle as of the beam outcoming from the cylindrical lens CL is lower than the acceptance angle αf of the feeding fiber to which it is coupled. In terms of Numerical Aperture of the feeding fiber itself it means that the NA of the fiber has to be greater than 0.3 in order to accept a beam of 35 degrees.

Figure 4:
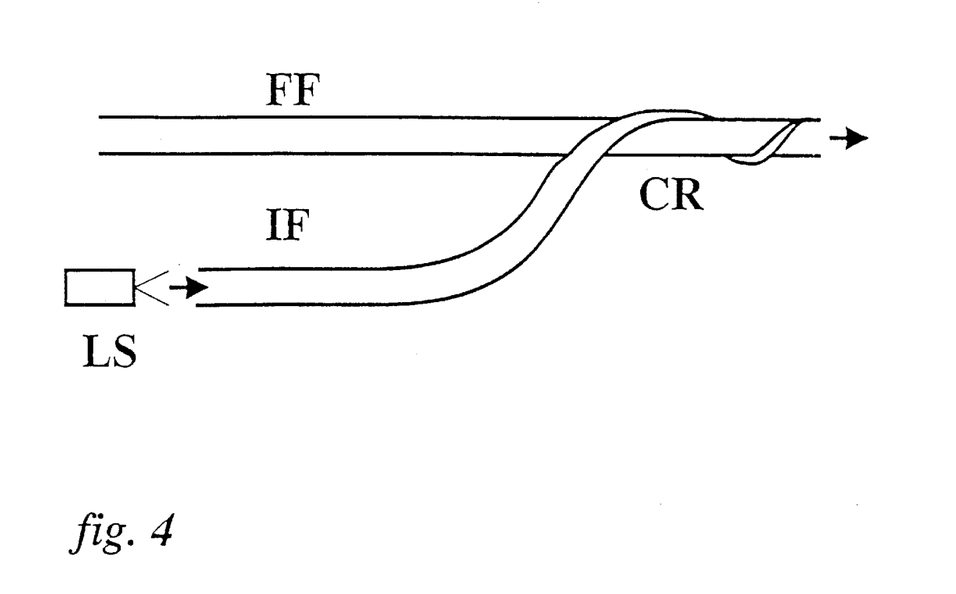
FIG. 4 shows an embodiment of the invention wherein the intermediate optical fiber has been tapered in the coupling region and forms an Y coupler.
Figure 5:
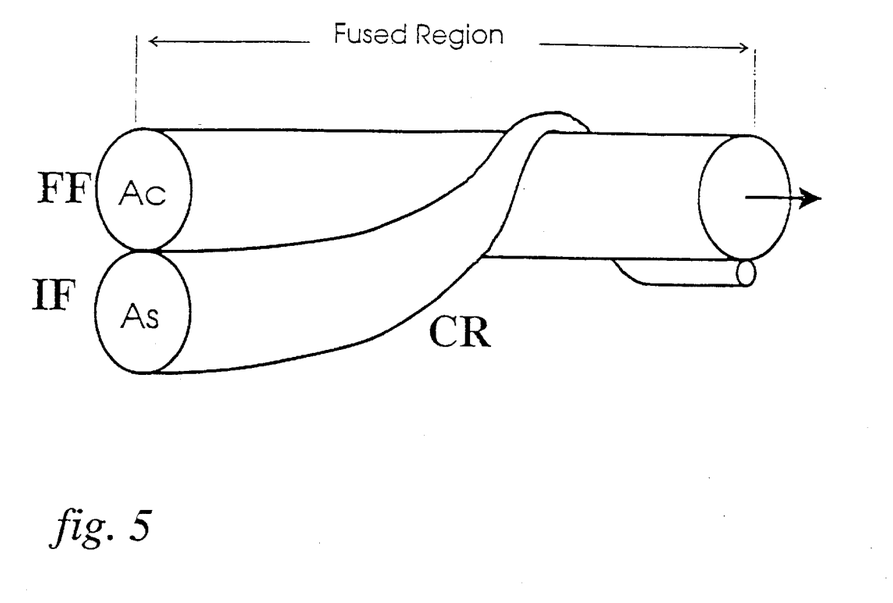
FIG. 5 shows with greater details the twisting of the tapered feeding fiber core around the fed fiber core.

The other end of the feeding fiber IF (or in case a remote portion of the feeding fiber) is fused together with the optical fiber FF as shown in FIG. 4. The splicing area designated with CR forms a so called Y coupler, since the splicing with the fiber FF takes place at the end of the feeding fiber IF.

It is further to point out that the optical fiber FF could also be the active fiber of a fiber laser.

Still in accordance with the invention, the cross sectional area of the feeding fiber IF in the coupling region CR is progressively reduced (so-called adiabatic core diameter reduction) until it reaches a value between 0.8 and 0.1 with respect to the starting value i.e. the diameter where the light beam LB enters the fiber. In other words the squared ratio of the diameters is comprised between 1.5 and 100.

Preferably the ratio between the minimum cross section area of the tapered feeding fiber IF and the initial cross section area thereof is from 0.01 to 0.7 and a more preferred value is about 0.1.

Preferably the ratio between the cross section area of the feeding fiber IF and the cross section area of the fed fiber FF in the coupling region CR is from 0.01 to 0.99.

It is preferred that the tapered portion of the feeding fiber is as shortest as possible, compatibly with the fiber resistance (capability) of withstanding a strong reduction of its cross section.

This is accomplished by drawing the feeding IF or at least a section thereof at a given temperature, then twisting the narrowing portion around the signal fiber FF and in contact therewith (see FIG. 5), and then slightly pulling the fibers raising the temperature until they merge together. This way one obtains a better contact. Preferably the progressively tapered portion of the multi-mode feeding optical fiber IF fused to said multi-mode optical fiber FF is helically wound around this latter.

When an X coupler is usea, at least a portion of the feeding fiber has a progressively decreasing diameter, falling within the above mentioned ranges, and in this portion is joined to the fed fiber FF.

Figure 6:
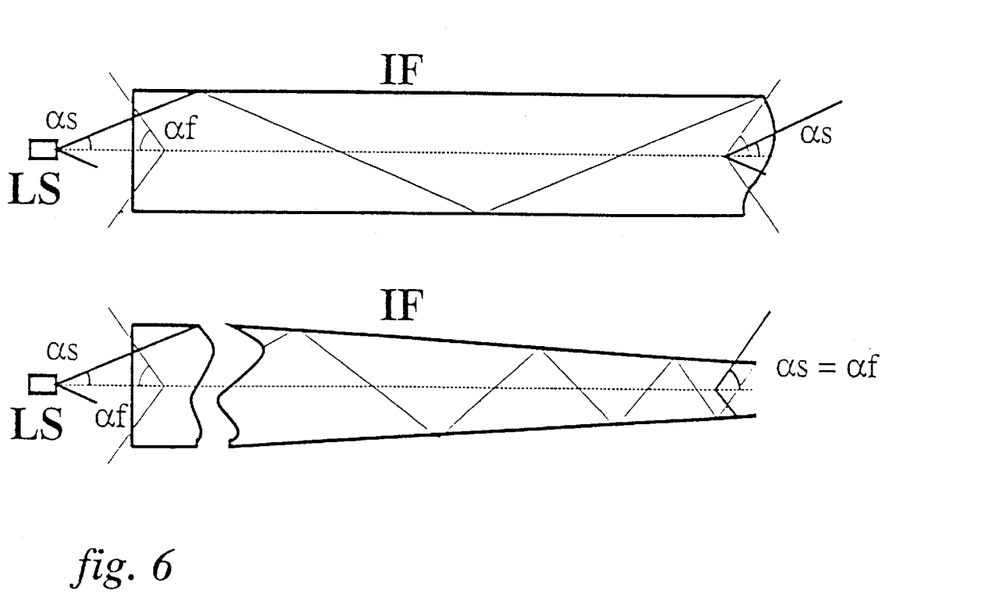
FIG. 6 is an explaining view showing the intermediate multi-mode optical fiber, and the optical path inside it, for illustrating the general principle of the invention.

With reference to FIG. 6 will be illustrated the principle upon which the invention is based.

As previously mentioned, the emission angle αs of the multi-mode source LS is a portion of the angle of acceptance αf of the intermediate multi-mode fiber IF, and αf is linked to the Numerical Aperture NA of the fiber by the relationship:

$$NA = \sin \alpha f$$

Due to the fiber tapering the propagation angle of the pump laser radiation carried by the feeding fiber is gradually increased along the tapered region.

Assuming that the fusion between the feeding fiber IF and the fed fiber FF occurs along the entire tapered region of the feeding. fiber IF and that the tapering ends with a negligibly small diameter, the relationship between the final divergence angle ac and the initial one as is:

$$ac @ as \times ((Ac + Af)/Ac)^{1/2}$$

where Ac and Af are the cross sectional areas of the fed fiber FF and the untapered feeding fiber IF respectively. Provided that, for given values of Ac and Af, as is chosen in such a way that ac does not exceed the acceptance angle of the fibers (let assume for sake of ease that the N.A. of both fibers are equal), a reduction of the feeding fiber core diameter is obtained without losses of light from the fiber itself due to the light angle of propagation increase.

In case the fusion between the the two fibers does not begin where the tapering of the feeding fiber starts, but rather at a different position within the tapered section, with a cross sectional area At of the feeding fiber, the above expression becomes:

$$a'c @ as \times (Af/At)^{1/2} \times ((At + Ac)/Ac)^{1/2}$$

corresponding to a larger increase in the divergence angle. The preferred arrangement is therefore the one described above.

Figure 7:
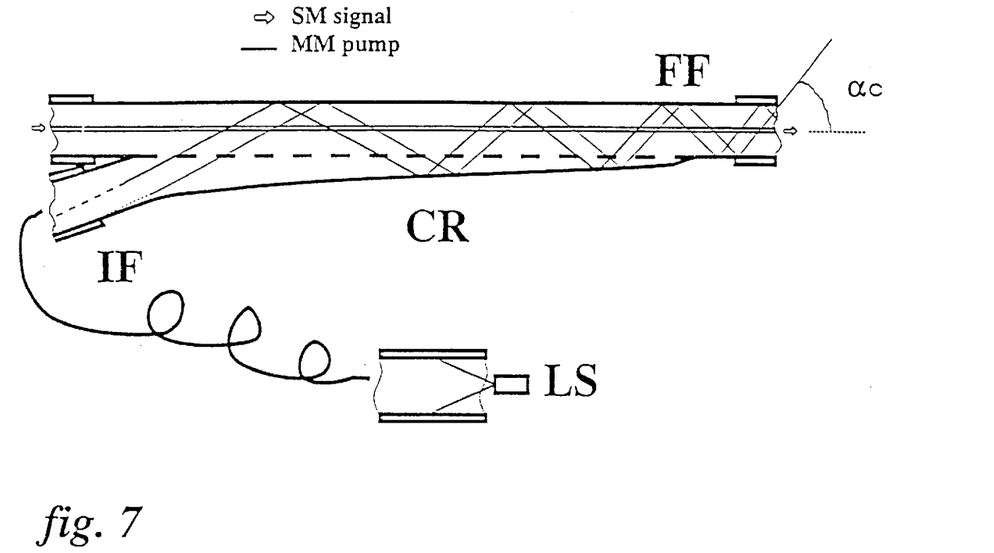
FIG. 7 schematically shows the coupling region and light paths for the feeding of a SM-DC optical fiber carrying a single-mode radiation as a signal with a multi-mode beam carried in a multi-mode core.

FIG. 7 shows with more detail the coupling region CR when a SM-DC fiber is adopted, including an inner concentrical single-mode core along which an optical signal carrying information propagates. Moreover the Figure schematically illustrates the light path of the pumping radiation when this latter is transferred from the multi-mode feeding fiber IF to the multi-mode core of the SM-DC fiber FF.

In order to maintain an efficient coupling the Numerical Aperture of the multi-mode core of the fed fiber FF has to be equal or greater than the Numerical Aperture of the feeding fiber IF.

It is worth to point out that, as described above, the most efficient coupling is achieved if the contact between said multimode optical fiber FF and said feeding fiber IF is substantially accomplished along the entire tapered region of the IF fiber.

Figure 8:
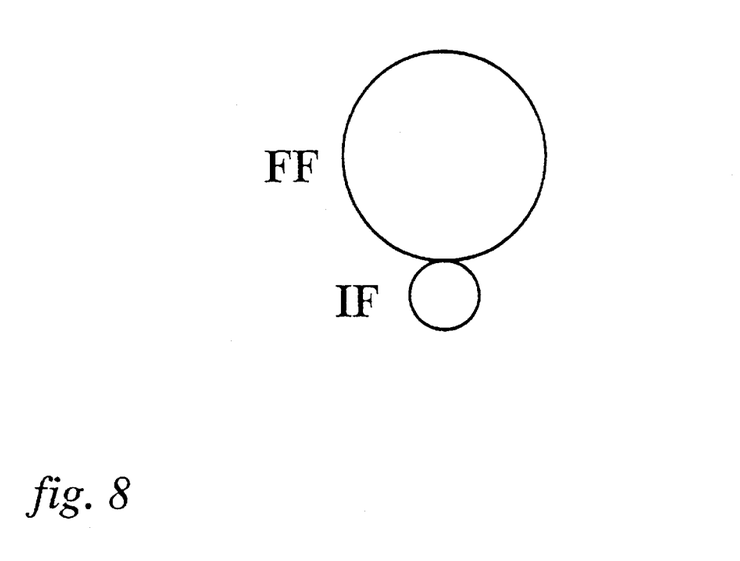
FIG. 8 shows a cross section profile of the end of the coupling region.

FIG. 8 illustrates a cross section of the coupling region CR (before the merging of the two fibers) where both the optical fibers have a substantially circular cross-section and are without cladding at the junction. For the SM-DC fiber the second (outer) cladding is considered to be removed.

Although the optimum coupling is obtained when both fibers are not provided with cladding layers, the invention applies also to fibers with unremovable cladding. In this case the coupling ratio will be reduced by an additional constant factor, which depends on the thickness of the cladding.

Figure 9:
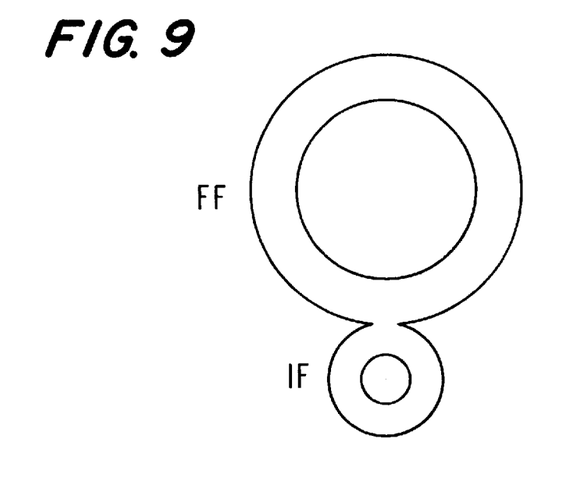
FIG. 9 shows a cross section of the end of the coupling region in case the cladding of the two fibers is mantained.

FIG. 9 shows a cross section of the coupling region CR with two circular fibers still retaining the outer claddings.

Figure 10:
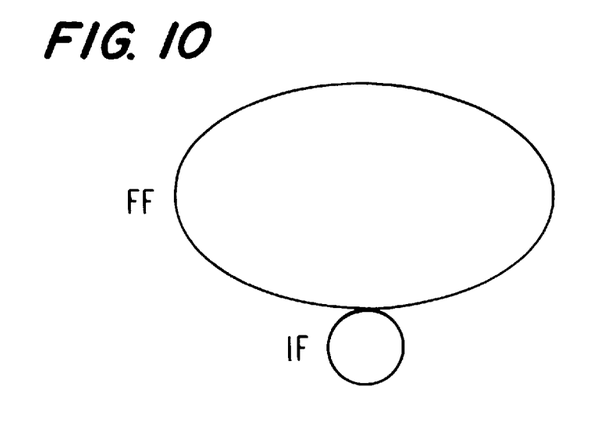
FIG. 10 shows a cross section of the end of the coupling region for a substantially elliptical fed fiber.
Figure 11:
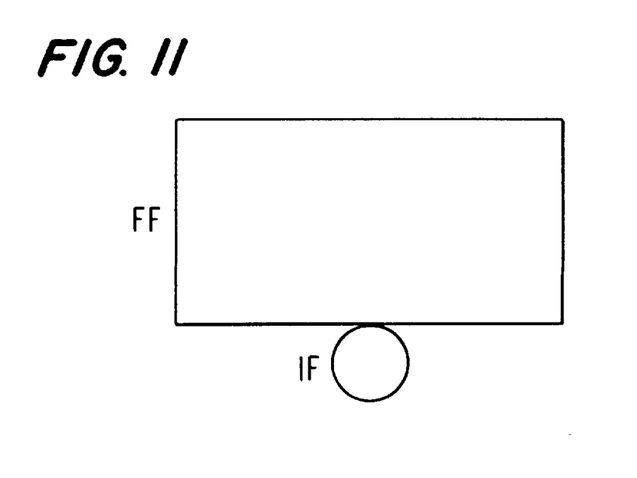
FIG. 11 shows a cross section of the end of the coupling region for a substantially rectangular fed fiber.

FIG. 10 illustrates a multi-mode optical fed fiber that have substantially elliptical cross section, and finally FIG. 11 shows a multi-mode optical fed fiber having substantially rectangular cross section. Of couse one or both the feeding fiber IF and the optical fiber FF can have one of the above illustrated cross sections.

With reference to FIGS. 8, 9, 10, and 11, it is evident that the ratio of the core area Ac at the coupling end with the source LS to the core area Af at the fused end, is larger than the ratio $\alpha f/\alpha s$ of the acceptance angle $\alpha f$ of the feeding fiber IF to the initial emission angle $\alpha s$ of the light source LS.

When using a single-mode core fiber, the core is preferably doped with a relatively large amount of ions of rare earth or ions of transitional metal, or in case with a combination thereof.

For example said single-mode core can be doped with both Ytterbium and Erbium ions, or Neodimium ions, or Ytterbium ions alone or Chromium ions.

Although preferred embodiments of the invention have been disclosed, several modifications and changes can be made to the same within the scope of the inventive idea.

We claim:

1. A coupling arrangement for non-axial transfer of light power between a multi-mode light source, having a substantially circular emission with a divergence angle $\alpha s$, and a multi-mode optical fiber with a cross section Ac, through a length of an intermediate feeding multi-mode optical fiber having an end with cross section area Af coupled with said light source and one portion fused to said multi-mode optical fiber, wherein said feeding fiber has a progressively tapered portion and is fused to said multi-mode optical fiber at a region of the progressively tapered potion, and in that the relationship between the acceptance angle $\alpha f$ of the feeding fiber and the emission angle $\alpha s$ of the light source is expressed by:

$$\alpha f = k \times \alpha s$$

where k is a positive constant greater than 1.

2. A coupling arrangement as claimed in claim 1, wherein said constant k is greater than $$((Af+Ac)/Ac)^{1/2}$$

where:
Af is the cross section area of the feeding fiber coupled with said light source, and
Ac is the cross section area of the multi-mode fiber.

3. A coupling arrangment as claimed in claim 1, wherein the region of fusion between said feeding fiber and said multi-mode optical fiber coincides substantially with the whole tapered region of said feedig fiber.

4. A coupling arrangement as claimed in claim 1, wherein said light source has a substantially elliptical mission and includes a device for converting such elliptical emission into a substantially circular emission with said divergence angle ($\alpha s$).

5. A coupling arrangement as claimed in claim 1, wherein said light source comprises a multi-mode semiconductor laser diode having a substantially rectangular radiating aperture, and a cylindrical lens located in the light beam of said laser diode, between said laser diode and the feeding fiber.

6. A coupling arrangement as claimed in claim 1, wherein said multi-mode optical fiber further contains an additional concentric single-mode core.

7. A coupling arrangement as claimed in claim 1, wherein said multi-mode optical fiber further contains an additional concentric single-mode doped core.

8. A coupling arrangement as claimed in claim 7, wherein said single-mode core is heavily doped with ions selected from the group of rare earth and transitional metal ions, or a combination thereof.

9. A coupling arrangement as claimed in claim 7, wherein said single-mode core is doped with both Ytterbium and Erbium ions.

10. A coupling arrangement as claimed in claim 7, wherein said single-mode core is doped by Neodimium ions.

11. A coupling arrangement as claimed in claim 7, wherein said single-mode core is doped by Ytterbium ions.

12. A coupling arrangement as claimed in claim 7, wherein said single-mode core is doped by Chromium ions.

13. A coupling arrangement as claimed in claim 1, wherein said optical fiber is the active fiber of an optical amplifier.

14. A coupling arrangement as claimed in claim 1, wherein said optical fiber is the active fiber of a fiber laser.

15. A coupling arrangement as claimed in claim 1, wherein said feeding optical fiber is coupled to said multi-mode optical fiber as an X-coupler configuration.

16. A coupling arrangement as claimed in claim 1, wherein said feeding optical fiber is coupled to said multi-mode optical fiber as an Y-coupler configuration.

17. A coupling arrangement as claimed in claim 1, wherein both said optical fiber and intermediate optical fiber are not provided with cladding layers at the fused area.

18. A coupling arrangement as claimed in claim 1, wherein at least one of said optical fiber and intermediate optical fiber is provided with a cladding layer at the fused area.

19. A coupling arrangement as claimed in claim 1, wherein at least one of said optical fiber and intermediate optical fiber has a cross section that is substantially circular.

20. A coupling arrangement as claimed in claim 1, wherein at least one of said optical fiber and intermediate optical fiber has a cross section that is substantially rectangular.

21. A coupling arrangement as claimed in claim 1, wherein at least one of said optical fiber and intermediate optical fiber has a cross section that is substantially rectangular.

22. A coupling arrangement as claimed in claim 1, wherein the ratio between the minimum cross section area of the tapered feeding fiber and the initial cross section area thereof is from 0.01 to 0.7.

23. A coupling arrangement as claimed in claim 22, wherein the ratio between the minimum cross section area of the tapered feeding fiber and the initial cross section area thereof is about 0.1.

24. A coupling arrangement as claimed in claim 1, wherein the ratio between the cross section area of the feeding fiber and the cross section area of the fed fiber in the coupling region is from 0.01 to 0.99.

25. A coupling arrangement as claimed in claim 24, wherein the ratio between the minimum cross section area of the tapered feeding fiber and the cross section area of the fed fiber in the coupling region is about 0.1.

26. A coupling arrangement as claimed in claim 1, wherein said progressively tapered portion of said multi-mode feeding optical fiber fused to said multi-mode optical fiber is helically wound around this latter.

* * * * *